(12) United States Patent
Eweka (10) Patent No.: US 9,159,498 B2
(45) Date of Patent: Oct. 13, 2015

(54) PREPARATION OF ELECTRODE COMPOSITIONS

(75) Inventor: Emmanuel Imasuen Eweka, Southampton (GB)

(73) Assignee: QinetiQ Limited (GB)

( * ) Notice: Subject to any disclaimer, the term of this patent is extended or adjusted under 35 U.S.C. 154(b) by 219 days.

(21) Appl. No.: 13/813,284

(22) PCT Filed: Aug. 19, 2011

(86) PCT No.: PCT/GB2011/001233
§ 371 (c)(1),
(2), (4) Date: Jan. 30, 2013

(87) PCT Pub. No.: WO2012/025708
PCT Pub. Date: Mar. 1, 2012

(65) Prior Publication Data
US 2013/0120908 A1    May 16, 2013

(30) Foreign Application Priority Data
Aug. 27, 2010    (GB) .................................. 1014317.0

(51) Int. Cl.
*H01G 9/00* (2006.01)
*H01G 9/04* (2006.01)
(Continued)

(52) U.S. Cl.
CPC ................ *H01G 9/058* (2013.01); *C01D 15/06* (2013.01); *H01G 11/06* (2013.01); *H01G 11/48* (2013.01); *H01G 11/50* (2013.01); *Y02E 60/13* (2013.01)

(58) Field of Classification Search
USPC ......... 361/502, 503–504, 509–512, 516–519, 361/523–525, 528–529
See application file for complete search history.

(56) References Cited

U.S. PATENT DOCUMENTS

| 3,932,586 A | 1/1976 | Guerrieri |
| 4,247,525 A | 1/1981 | Voeste |

(Continued)

FOREIGN PATENT DOCUMENTS

| DE | 4015147 | 7/1991 |
| GB | 2266179 | 10/1993 |

(Continued)

OTHER PUBLICATIONS

Friend et al., "Lithium Sulphite and Some Derivatives", Journal of the Chemical Society, Jan. 1, 1928, pp. 2245-2248.

(Continued)

*Primary Examiner* — Nguyen T Ha
(74) *Attorney, Agent, or Firm* — McDonnell Boehnen Hulbert & Berghoff LLP (57) ABSTRACT

The invention relates to processes for the preparation of electrode compositions, especially those intended for use in supercapacitors. A process is provided for preparing lithium sulphite comprising the steps of:—a) introducing $H_2SO_3$ (aq) into a reaction vessel; b) reacting the $H_2SO_3$ (aq) with an aqueous suspension of $Li_2CO_3$ in the vessel to form an aqueous solution of $Li_2$—$CO_3$; and c) evaporating the solution to recover $Li_2CO_3$(s), wherein at least steps a) and b) are conducted under an inert atmosphere. Preferably, in step b) $H_2SO_3$ (aq) and $Li_2CO_3$ (aq) are reacted with each other in substantially equimolar amounts. There is also provided a process for forming an electrode material comprising a complexing step of causing lithium sulphite to form $SO_3$ complexes at active N sites of a nitrogen-carbon structure, in the presence of a selected amount of a sink that absorbs the liberated lithium, so as to form the $N:SO_3$ complexed electrode material. Preferably, the nitrogen-carbon structure is thermally restructured polyacrylonitrile (TR-PAN) or a copolymer thereof.

10 Claims, 6 Drawing Sheets

(51) Int. Cl.
*C01D 15/06* (2006.01)
*H01G 11/48* (2013.01)
*H01G 11/50* (2013.01)
*H01G 11/06* (2013.01)

(56) References Cited

U.S. PATENT DOCUMENTS

| | | | |
|---|---|---|---|
| 5,266,296 | A | 11/1993 | Bortle et al. |
| 6,017,500 | A | 1/2000 | Mehta |
| 6,403,256 | B1 * | 6/2002 | Gan et al. ............. 429/215 |
| 6,670,078 | B1 * | 12/2003 | Sato et al. ............. 429/340 |
| 7,592,095 | B2 * | 9/2009 | Lee et al. ............. 429/118 |
| 8,216,445 | B2 * | 7/2012 | Anderson et al. ....... 205/701 |
| 8,313,719 | B2 * | 11/2012 | Barker et al. ......... 423/302 |
| 2004/0224233 | A1 | 11/2004 | Chen et al. |
| 2008/0044729 | A1 | 2/2008 | Gilmour |

FOREIGN PATENT DOCUMENTS

| | | |
|---|---|---|
| GB | 2335073 | 9/1999 |
| WO | WO95/34920 | 12/1995 |
| WO | WO2009/062984 | 5/2009 |

OTHER PUBLICATIONS

Brittin et al., "Novel Supercapacitors", Proceedings of the 40th Power Sources Conference, Cherry Hill, USA, Army Communications-Electronics Command, Fort Monmouth, NJ, Jun. 13, 2002, pp. 68-71.

Cowie et al., "Novel Single Ion, Comb-branched Polymer Electrolytes", Solid State Ionics, vol. 123, No. 1-4, Aug. 1, 1999, pp. 233-242.

* cited by examiner

PREPARATION OF ELECTRODE COMPOSITIONS

FIELD OF THE INVENTION

This invention relates to processes for the preparation of electrode compositions, especially those intended for use in supercapacitors, and to methods of forming electrodes and cells containing or derived from those compositions. The invention also relates to an improved method for synthesising lithium sulphite.

BACKGROUND OF THE INVENTION

Batteries can store lots of energy but have low power, taking a long time to charge or discharge. Conventional capacitors have enormous power but can usually only store tiny amounts of energy. Supercapacitors offer a unique combination of high power and high energy. When a supercapacitor is charged, there is no chemical reaction, rather energy is stored as a charge or concentration of electrons on the surface of a material. Supercapacitors can therefore charge and discharge at high rates since only charge transfer is involved, and can undergo a large number of cycles without any apparent degradation (e.g. >100,000 cycles).

Supercapacitors, also known as ultracapacitors, or electrochemical double layer capacitors (EDLC) use a double layer of high surface area carbon separated by an exceedingly thin insulator to achieve high capacitance. In a paper entitled "Novel Supercapacitors", p 68, Proceedings of the 40th Power Sources Conference, Cherry Hill, USA, Jun. 10-13, 2002 (hereinafter referred to as the "2002 paper"), one of the present inventors, inter alia, disclosed a new type of supercapacitor where, in addition to the double layer capacitance, additional capacitance or "pseudo-capacitance" was obtained using nitrogen-containing carbon polymers where complexes had been incorporated at certain nitrogen sites, migration of solution species towards and away from these sites giving rise to this pseudo-capacitance.

Figure 3:
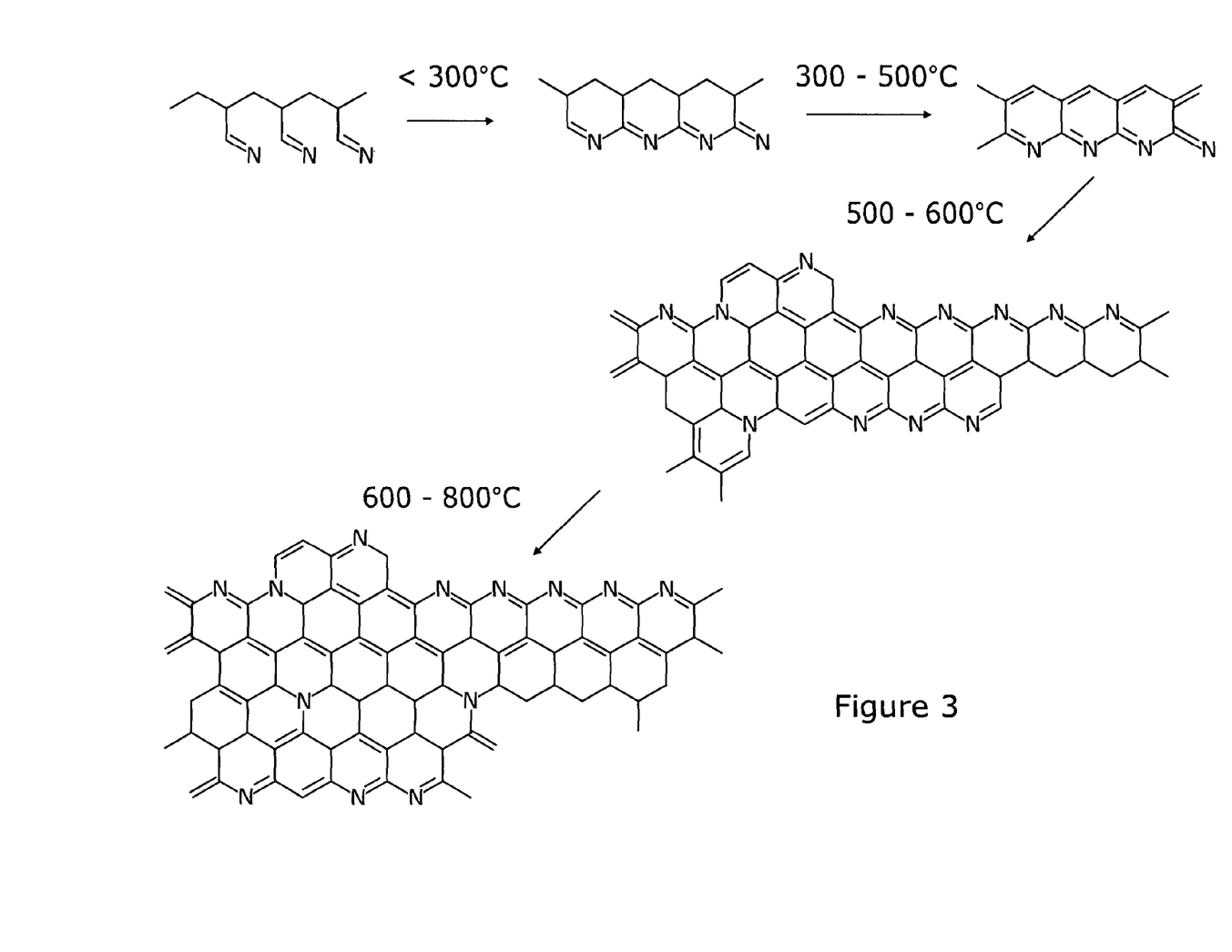
FIG. 3 illustrates schematically how the structure of PAN changes with increasing pyrolysis temperature.
Figure 4:
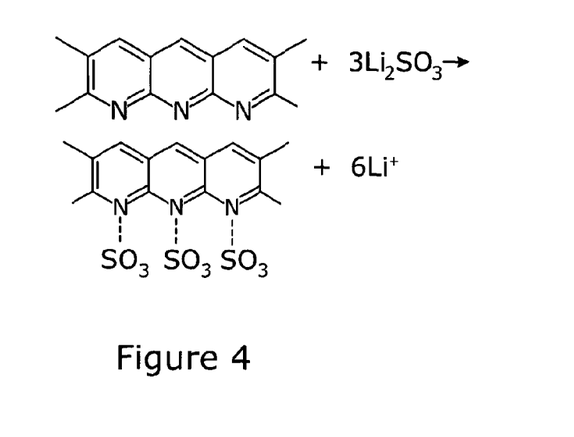
FIG. 4 illustrates schematically how complex formation with lithium sulphite occurs in TR-PAN.

In the 2002 paper, polyacrylonirile (PAN) was used as a cheap and readily available polymer. Pyrolysis of PAN leads to increasingly complex, conjugated and cyclised molecules containing nitrogen in pyridine-like rings, but it was found that N content decreases with increased heating, as illustrated in FIG. 3 below. Steps were therefore taken to obtain a pyrolysed PAN with a sufficient N content but also with a suitably high surface area, open, porous structure that would permit complex formation and ion species migration. The pyrolysed PAN was then combined with lithium sulphite, $Li_2SO_3$, with the aim of subsequently forming N:sulphur trioxide $SO_3$ complexes at the nitrogen sites. The 2002 paper describes lithium sulphite as being incorporated in the pyrolysed polymer and then provided as an electrode in a cell where, upon charging, the lithium sulphite was electrolysed to form sulphur trioxide, which subsequently complexed with nitrogen in the pyrolysed PAN. Supercapacitor cells made from those modified electrodes were found to have increased capacitance as compared with unmodified PAN electrodes (i.e. without complexed N sites).

One of the authors of the 2002 paper also filed two patent applications published as GB2266179 and GB2335073, respectively. GB2266179 teaches secondary cells in which the cathode (positive electrode) composition consists of a solid complex of sulphur trioxide and a polymeric tertiary amine (the complex being formed by a previous chemical reaction) and the anode is lithium. GB2335073 describes GB2266179 as disclosing electrochemical cells with low energy densities due to the high ratios of carbon to nitrogen functionality. GB2335073 itself is directed to improved secondary cells with similar light metal anodes and similar cathodes of N—C polymers complexed with sulphur trioxide except that these polymers have conjugated imine functionality, preferably formed by thermally restructuring nitrile containing polymers. GB2335073 teaches that charging of the secondary cells causes lithium to be electroplated at the anode and discharging causes recombination of lithium with the $SO_3$ complexes: hence, it states that $SO_3$ acts not only as polymer dopant but also as sites for the reversible redox electrochemistry of $Li_2SO_3$.

Journal of the Chemical Society, pages 2245-8, (1928), describes a method for synthesising lithium sulphite in which a mixture of hydrogen and sulphur dioxide is passed through lithium carbonate solution until effervescence ceases, and the flask is then heated while passing through dry hydrogen (to prevent oxidation) until anhydrous lithium sulphite is produced. Since sulphur dioxide is a corrosive gas, and hydrogen is a flammable gas, this process is not ideal.

SUMMARY OF THE INVENTION

The present invention is directed towards providing improved methods for forming $SO_3$ complexed electrode materials, including providing an improved method of synthesising $Li_2SO_3$.

The present invention provides, in a first aspect, a process for preparing lithium sulphite comprising the following steps:
  a) introducing $H_2SO_3$ (aq) into a reaction vessel;
  b) reacting the $H_2SO_3$ (aq) with an aqueous suspension of $Li_2CO_3$ in the vessel to form an aqueous solution of $Li_2SO_3$; and,
  c) evaporating the solution to recover $Li_2SO_3$(s), wherein at least steps a) and b) are conducted under an inert atmosphere.

By introducing the $SO_3$ functionality into the reactor in the form of sulphurous acid, the use of hazardous gases is avoided and the amount and rate of acid addition can be carefully controlled. The process is usually conducted as a batch process in a reaction vessel maintained under an inert atmosphere (e.g. $N_2$ or Ar), and usually at a raised pressure to prevent air influx. No other reactants or catalysts will usually be present.

Ideally the two reactants are reacted in substantially equimolar amounts (that is up to +−3%) and this may be achieved by adding $H_2SO_3$ (aq) by titration. An excess of lithium carbonate in the final product would contaminate the electrode material, while an excess of acid would lead to the undesirable formation of $LiHSO_3$. $Li_2CO_3$ is only sparingly soluble in water whereas $Li_2SO_3$ is very soluble, and hence, the end point of the reaction is clearly identified by the point where the solution (previously a white emulsion) goes clear and colourless, and effervescence ceases; at this point the pH is usually ~pH 7-7.5.

It is crucial that the actual reaction is carried out under an inert atmosphere as $Li_2SO_3$ is readily oxidised to $Li_2SO_4$ in the presence of water. The lithium carbonate solution should usually be pre-flushed with inert gas. The $H_2SO_3$ should also preferably be pre-flushed with inert gas and held in a sealed vessel, being added in incremental amounts to avoid $SO_2$ fuming. Also the inert gas purging is preferably conducted from the bottom of the reaction vessel, while titration occurs from above, to minimise loss of $SO_2$ from the $H_2SO_3$. In step c) care should still be taken to minimise oxidation and hence the evaporation should preferably be conducted under vacuum, or inert gas purging should preferably continue.

Thus, the present invention provides a process for producing lithium sulphite, the process comprising introducing sulphurous acid into a reaction vessel and reacting it with lithium carbonate under an inert atmosphere to form an aqueous solution and then evaporating the solution to recover the lithium sulphite. As described in the above 2002 paper, the lithium sulphite may then be used as a precursor to a complexing agent and may be mixed in with a suitable high surface area, N containing pyrolysed polymer in order to improve its properties as an electrode material, especially for supercapacitors. As previously explained, the polymer once combined with lithium sulphite, $Li_2SO_3$, and incorporated into an electrode is of the nature of a precursor electrode material, which would normally require an electrochemical charging or formation step to generate N:sulphur trioxide $SO_3$ complexes at the nitrogen sites.

In a second aspect of the present invention, there is provided a process for producing an electrode composition or material, comprising conducting the process as described above with steps a) to c), wherein between step b) and step c) a nitrogen-carbon structure suitable for use as an electrode material is added to the solution and step c) is then conducted to yield an intimate mixture of $Li_2SO_3(s)$ and the nitrogen-carbon structure.

By incorporating the nitrogen-carbon structure into the lithium sulphite synthesis so that lithium sulphite is intimately precipitated in situ around the nitrogen-carbon structure, it is possible to achieve a more homogenised precursor electrode material, and hence one with lower resistance and a better material utilisation. By adapting the lithium sulphite synthesis, the subsequent electrode fabrication process is, of course, also simplified.

By the use of the term "nitrogen-carbon structure suitable for use as an electrode material", we mean, in this context, any carbon based structure which has the requisite nitrogen functionality to form $SO_3$ complexes and that is suitable for use as an electrode, especially supercapacitor electrodes. Many carbon based structures are known for use as supercapacitor electrodes. As with all electrodes they need to only contain components that do not react unfavourably with the electrolyte, and in the context of supercapacitors they need to have a high surface area, and an open porous structure that will permit ion migration and a robust structure that can withstand the effects of cycling. Supercapacitor electrode materials may typically be formed from activated carbons, or from polymers, for example, electrically conducting polymers (ECP's), or from carbon nanostructures or composites (e.g. ECP coated carbon nanotubes where the nanotubes absorb the mechanical stress) or from thermally restructured polymers which will have increased strength, conjugation and surface area. Especially preferred are any thermally restructured polymers comprised of conjugated arrays with imine functionality (i.e. containing a carbon-nitrogen double bond), whereby the tertiary nitrogen sites can act as hosts to subsequent $SO_3$ complex formation. Ideally, the thermally restructured polymers are cyclised carbon structures with active pyridinic N-6 (6 membered ring) N sites. For example, the polymer may be formed by the thermal cyclization of nitrile containing polymers such as, for example, acrylonitrile or copolymers thereof, such as fumaronitrile or maleonitrile. When thermally restructured at temperatures of up to 600° C. in an anaerobic environment, conjugated, cyclised arrays of imine functionality are incorporated into such material.

This second aspect of the invention therefore provides a single process step for providing a precursor electrode material that may then be transformed by an electrochemical charging or formation step to generate N:sulphur trioxide $SO_3$ complexes at the nitrogen sites, which can then give rise to the increased capacitance (due to pseudo-capacitance).

Figure 5:
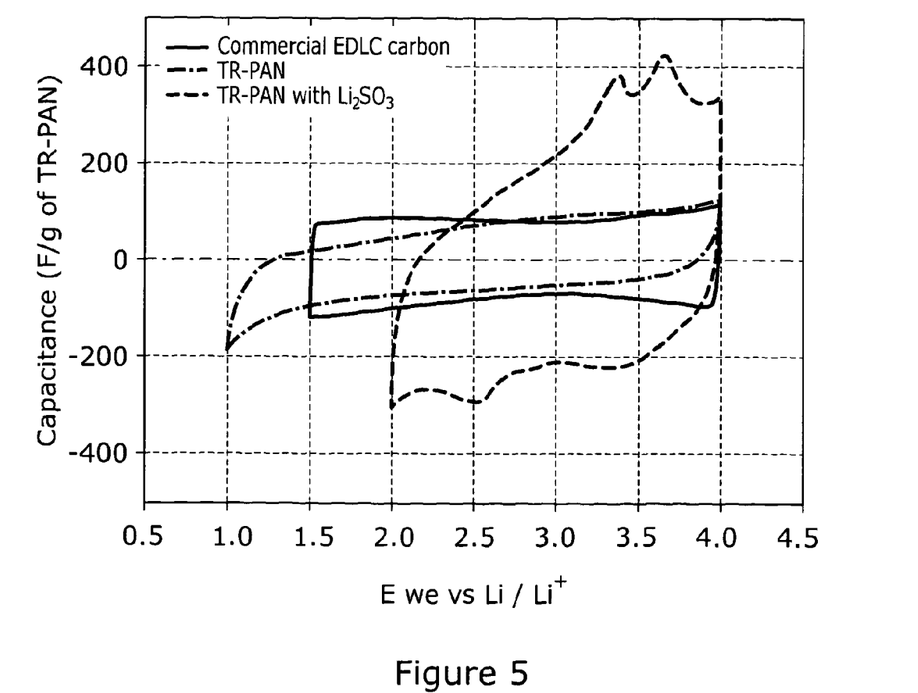
FIG. 5 shows cyclic voltammograms for various TR-PAN electrodes and comparative electrodes recorded in three-electrode measurement mode.

By way of illustration, FIG. 5 below shows cyclic voltammograms for various TR-PAN electrodes recorded in three-electrode measurement mode (i.e. using a Swagelok test cell) at a scan rate of 10 mV/s. A TR-PAN electrode modified with $Li_2SO_3$ to form complexed TR-PAN (prepared by an electrochemical formation step) is compared with an unmodified TR-PAN electrode and a commercial electric double layer electrode. The peaks in the electrodes containing $Li_2SO_3$ are due to "doping and de-doping" of the N—$SO_3$ complex (or, more correctly, migration of charge from solution species in the electrolyte on and off the complex sites) formed during the formation step. These peaks are noticeably absent in the baseline TR-PAN electrode and commercial EDLC activated carbon benchmark (i.e. a typical EDLC box-like trace). The specific capacitance at 3.5 V (vs Li/Li+) for the TR-PAN, commercial activated carbon and modified TR-PAN respectively, is 110 F/g, 100 F/g and 400 F/g. Results indicate that modifying by use of $Li_2SO_3$ as a complexing agent has enhanced the capacitance by 4 times.

In a third aspect of the present invention, there is provided a process for forming an electrode material comprising a complexing step of causing lithium sulphite to form $SO_3$ complexes at active N sites of a nitrogen-carbon structure, in the presence of a selected amount of a sink that absorbs the liberated lithium, so as to form the N:$SO_3$ complexed electrode material.

The deliberate use of a sink to absorb the lithium ions is novel and provides a superior electrode material from which supercapacitors with very high energy density (capacity) at high power can be produced. Rather than merely allowing the liberated lithium to be absorbed by a traditional counter electrode (e.g. carbon cloth), where it could still be electrochemically active during cycling, it is preferable deliberately to provide a selected amount of a sink capable of efficiently removing the lithium, preferably in an irreversible fashion. The sink also ensures that the complexing reaction is driven to completion.

The nitrogen-carbon structure is as hereinbefore defined. Especially preferred are any thermally restructured polymers comprised of conjugated arrays with imine functionality (i.e. containing a carbon-nitrogen double bond), whereby the tertiary nitrogen sites can act as hosts to subsequent $SO_3$ complex formation. Ideally, the thermally restructured polymers are cyclised carbon structures with active pyridinic N-6 (6 membered ring) sites. For example, the polymer may be formed by the thermal cyclization of nitrile containing polymers such as, for example, acrylonitrile or copolymers thereof, such as fumaronitrile or maleonitrile. Due to the low cost and availability of PAN, the use of thermally restructured polyacrylonitrile (TR-PAN) is highly preferred.

The nitrogen-carbon structure will contain a variety of different N sites, but not all of these will be active N sites. By "active nitrogen sites", we mean those N sites capable of complexing with $SO_3$. It is highly desirable to determine the amount of active N sites in the structure i.e. ones with the functionality and accessibility to be capable of complexing and hence providing pseudo-capacitance. For example, in TR-PAN of the N-6, N-5 and N-Q sites, only the N-6 sites will be active sites. Hence, the process will usually include an earlier step of calculating the amount of active N sites in the nitrogen-carbon structure.

To avoid excess lithium sulphite in the electrode material, the lithium sulphite should be used roughly in an equimolar ratio with the amount of active N sites in the nitrogen-carbon structure (+−5%). Since the function of the sink is to absorb released lithium, the amount of the sink selected is preferably closely based on the amount of lithium sulphite used, depending on the manner in which the sink absorbs the liberated lithium. In the case of an intercalation compound, it can be calculated how much intercalation compound is needed to absorb a particular amount of lithium. If the sink reacts in a chemical manner, then the requisite stoichiometric ratio should be provided. Thus, in the case of a transition metal oxide, this will be in roughly an equimolar ratio with lithium sulphite, which is itself preferably used roughly in an equimolar ratio with the number of active N sites of the nitrogen-carbon structure.

The sink preferably absorbs the lithium ions in an irreversible manner, preferably by a chemical reaction. The use of transition metal oxides is preferred; such metals have suitable densities and reduction potentials and will leave a metallic residue that will at least contribute generally to the conductivity of the electrode material. Ideally, the sink is a metal oxide selected from the group consisting of CuO, SnO, and NiO.

Other sinks may also be used, where desired, such as for example, intercalation compounds, which are known to absorb lithium efficiently. Lithium titanate is one such example, and performs successfully as a sink, although not as well as transition metal oxide sinks; this may be due to issues of reversibility or lack of conductivity in the final electrode material after complexing. The amount of lithium titanate needed to absorb a certain amount of lithium can be calculated so that the use of excess titanate is avoided.

The sink may be located in the same electrode material as the lithium sulphite or in a counter electrode.

The complexing step may be conducted as an electrochemical formation step in a supercapacitor cell, wherein the nitrogen-carbon structure and lithium sulphite is located in a first electrode and the sink is located in a counterelectrode that absorbs the lithium during the complexing step.

Alternatively, the complexing step may be conducted as a chemical reaction between lithium sulphite and the sink in an aqueous solution in the presence of the nitrogen-carbon structure. This may allow the lithiated sink residues to be removed before forming the final electrode.

The $N:SO_3$ complexed electrode material may subsequently used to form a supercapacitor, the $SO_3$ complexes giving rise to the desired pseudo-capacitance.

An asymmetric supercapacitor may be produced by the above electrochemical formation step, wherein the supercapacitor is formed from the said first electrode and said counterelectrode i.e. it is ready for use straight after the formation step. It will be appreciated, however, that in this arrangement the counterelectrode will contain the residual lithiated sink material, which performs no further function in the working supercapacitor. Moreover, only one electrode is benefiting from the presence of the complexed TR-PAN. Accordingly, a higher performance symmetric supercapacitor produced by the above electrochemical formation step, but wherein the supercapacitor is subsequently formed from a pair of electrodes, each of which is the first electrode (containing complexed TR-PAN), is more preferred.

DESCRIPTION OF THE DRAWINGS

Embodiments in accordance with the various aspects of the present invention will now be described, by way of example only, with reference to the accompanying drawings.

DESCRIPTION OF THE INVENTION

Examples

Example 1

Preparation of $Li_2SO_3$ Via the Sulphurous Acid Route

This Example illustrates how lithium sulphite may be synthesised in accordance with the first aspect of the invention.

A white suspension is prepared in a three-necked round bottom flask by the addition of 0.74 g of lithium carbonate ($Li_2CO_3$) to 10 ml of water under a constant flow of argon. A 5% w/w solution of sulphurous acid ($H_2SO_3$) is purged with argon for 10-15 minutes and then added drop wise to the cloudy suspension until a clear solution was formed and effervescence ceases. The pH of the solution is monitored, and purging continued throughout the course of the reaction. The clear solution is evaporated to dryness to form a hard white solid using a rotary vacuum evaporator at about 120° C. for 4 hours. Following this, the solid is crushed into small lumps, ground to a fine powder and then transferred to a Buchi furnace for additional drying at 180° C. under vacuum for a further 2-3 hours. The sample is characterised using DSC analysis to determine its melting point.

Figure 1:
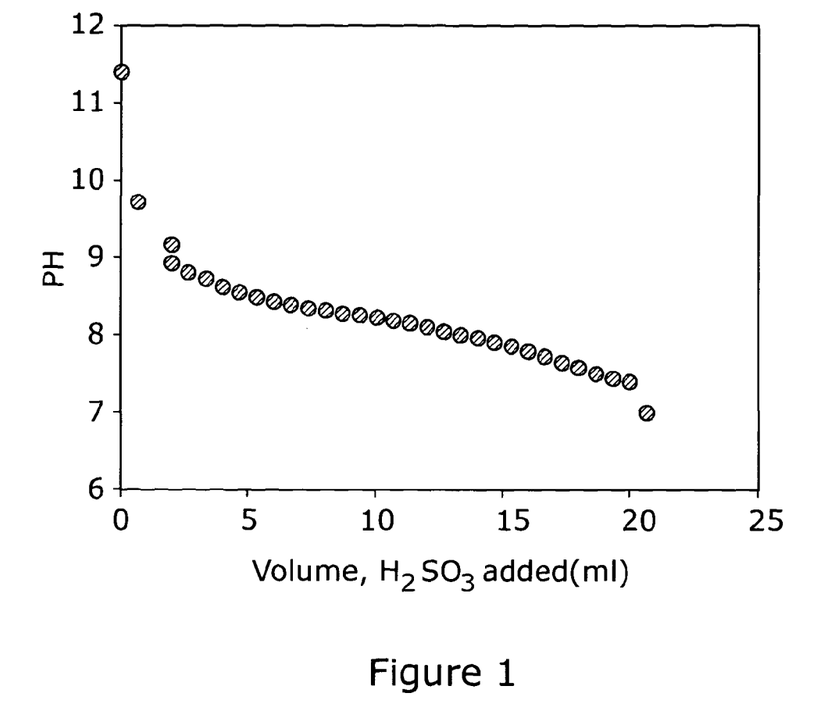
FIG. 1 is a graph showing the change in pH during the synthesis of $Li_2SO_3$ from sulphurous acid and lithium carbonate in Example 1.

Referring to FIG. 1, the pH of the starting white suspension is about 11.4. This drops sharply on the addition of a few drops of sulphurous acid solution, followed by a gradual drop to ~7.5, coincident with the formation of a clear solution and the end point of the reaction.

Figure 2:
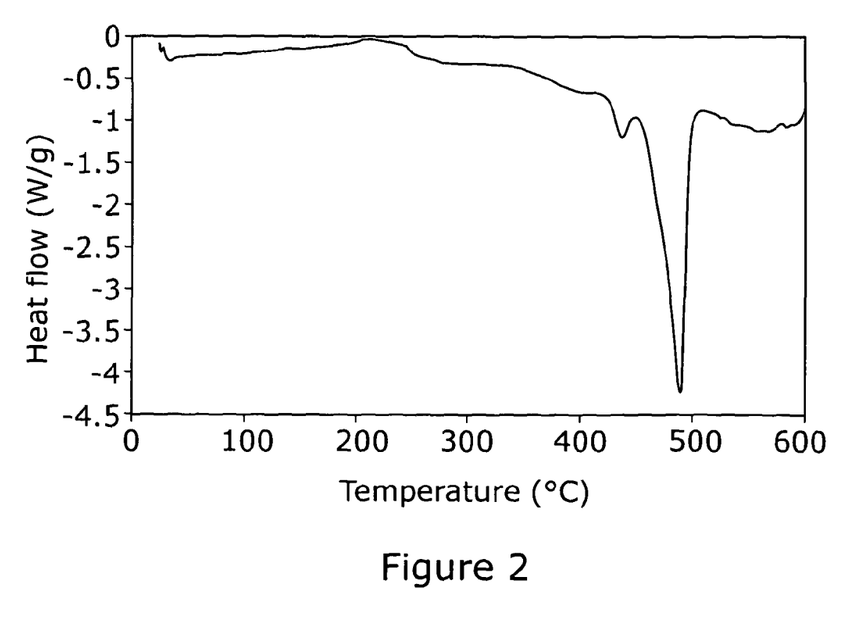
FIG. 2 is a DSC trace for $Li_2SO_3$ produced by Example 1.

It was not possible readily to characterise $Li_2SO_3$ by standard techniques as $Li_2SO_3$ is so readily oxidised to $Li_2SO_4$ in the presence of water, but a DSC trace was obtained and an endotherm identified at 487° C., as shown in FIG. 2, characteristic of $Li_2SO_3$.

The white powder was subsequently mixed with TR-PAN and fabricated into a supercapacitor composite electrode.

Example 2

Preparation of $Li_2SO_3$ Via the Sulphurous Acid Route with In-Situ Impregnation of TR-PAN to Form an Electrode Material This Example, in accordance with the second aspect of the invention, illustrates how the lithium sulphite synthesis of the first aspect may be modified so that an electrode composition is formed during the synthesis.

First, thermally restructured (TR) PAN was generated as the main active electrode material according to the teaching of the above-mentioned 2002 paper. While surface area increases with pyrolysis temperature, N-content reduces and hence, commercially available PAN was thermally restructured by heating in a furnace at up to 750° C. in the presence of powdered $Na_2CO_3$; $Na_2CO_3$ was added to the PAN in a ratio of about 3:1 to promote pore formation leading to an open and porous structure. After cooling, the residual $Na_2CO_3$ was washed out with water and the TR-PAN was dried. The TR-PAN had specific surface areas of >900 $m^2g^{-1}$ and nitrogen contents of 6-7% w/w.

Turning to the $Li_2SO_3$ synthesis, a white suspension or slurry is prepared in a three-necked round bottom flask by the addition of 0.74 g of lithium carbonate ($Li_2CO_3$) to 10 ml of water under a constant flow of argon. A 5% w/w solution of sulphurous acid ($H_2SO_3$) is gently purged with argon for 10-15 minutes and then added to the suspension drop wise, until a clear solution is formed and effervescence ceases. The pH of the solution is monitored, and purging continued throughout the course of the reaction. About 1.8 g of thermally restructured (TR) PAN is then added to the clear solution and the resulting black suspension is evaporated to dryness using a rotary vacuum evaporator at about 120° C. for 4 hours. The mixed product, a soft, dark grey to black solid (~2.7 g), is finely ground to a powder and further dried at 180° C. under vacuum with a Buchi furnace for 2-3 hours. The mixed powder is then fabricated into a supercapacitor composite coated electrode for electrochemical characterisation.

Example 3

In-Situ Chemical Synthesis of TR-PAN/SO$_3$ Complex for TR-PAN-Based Symmetric Capacitors

This Example, in accordance with the third aspect of the invention, illustrates the use of a sink to absorb lithium ions during a complexing step conducted in solution to form $SO_3$ complexed TR-PAN electrode material suitable for a supercapacitor.

Thermally restructured (TR) PAN was generated as detailed in Example 2.

Synthesis of lithium sulphite is carried out similarly to Example 2 above in that TR-PAN is again added prior to the evaporation step. However, rather than merely forming the precursor lithium sulphite/TR-PAN electrode material, the synthesis is carried out in the presence of a lithium sink such that a complexing step can simultaneously take place to form the complexed TR-PAN in situ.

A white suspension is prepared in a three-necked round bottom flask by the addition of 0.74 g of lithium carbonate ($Li_2CO_3$) to 10 ml of water under a constant flow of argon. A 5% w/w solution of sulphurous acid ($H_2SO_3$) is purged with argon for 10-15 minutes and then added to the suspension drop wise, until a clear solution is formed and effervescence ceases. The pH of the solution is monitored (7 to 7.5), and purging continued throughout the course of the reaction. About 1.8 g of thermally restructured (TR) PAN and 0.16 g of CuO, as the lithium sink, is then added to the clear solution and the resulting black suspension is evaporated to dryness using a rotary vacuum evaporator at about 120° C. for 4 hours. The product a soft, dark grey to black solid (~2.9 g) is finely ground to a powder and further dried at 180° C. under vacuum with a Buchi furnace for 2-3 hours. The powder is then fabricated into a supercapacitor composite coated electrode for electrochemical characterisation. If desired, steps may be taken to remove the resulting copper, although it will in any case contribute to conductivity.

It is cheaper and more convenient to conduct the complexing step as a chemical reaction in solution where the sink is a metal oxide. The lithium sulphite is already present as ion species in solution, and hence the reaction can readily take place without assistance as follows:

The subsequent electrode fabrication process is thus simplified since there is no need to conduct the usual electrochemical formation step with a different counter electrode.

Example 4

Preparation of Anode and Cathode for High Energy Supercapacitors

This Example, in accordance with the third aspect of the invention, illustrates the use of a sink (in a counter electrode) to absorb lithium ions during a complexing step to form $SO_3$ complexed TR-PAN supercapacitors. The performance of symmetric and asymmetric supercapacitors is described and may be compared with that of Example 5, a control Example, where no lithium sink was present.

4A—Preparation of Anode Components

TABLE 1

| Anode components | |
|---|---|
| Material | Composition by weight (% w/w) |
| TR-PAN (active material) | 58.2 |
| Activated carbon (AC) | 14.5 |
| Denka Black (carbon additive) | 6 |
| CuO (Li$^+$ sink) | 11.3 |
| PVDF (binder) | 10 |

Copper oxide (CuO), TR-PAN, activated carbon and Denka Black powders were dried separately at 120° C. under vacuum for 2 hours. 3.9 g of CuO, 20 g of TR-PAN, 5 g of activated carbon and 2 g of Denka Black were then ground and mixed (or bead milled using a planetary mixer) and added to 28.6 g of a 12 ww % solution of PVDF in NMP with constant stirring using a T50 overhead mixer for 1-2 hours until a smooth and homogenous viscous composite ink (or slurry) was obtained. 70 g of excess NMP was added to achieve the desired viscosity and consistency. The ink was cast onto Al foil to form a coating using a Doctor-Blade technique. In the first instance, the wet coatings were dried at 100° C. for 2 hours to remove excess solvent, followed by 120° C. under dynamic vacuum to expel remaining traces of solvent. After evaporation of the solvent thin composite films were obtained.

Electrodes of a geometrical area of 1 cm² were punched out of the coated sheets and assembled into lab cells with a Li₂SO₃ based cathode, as described below. A porous glass fibre (Whatman), Celgard 3501 or PTFE based separator was used to electronically separate the cathode from the anode, and either 1M LiBF₄ (lithium tetrafluoroborate) and tetraethyl ammonium tetrafluoroborate (NEt₄BF₄) in propylene carbonate (PC) or 1.5M LiBF₄ in γ-butyralactone/ethylene carbonate (GB/EC) mixture was used as the electrolyte. Ink preparation and cell assembly were carried out in a dry room.

4B—Preparation of Cathode Components

TABLE 2

Cathode components

| Material | Composition by weight (% w/w) |
|---|---|
| TR-PAN (active material) | 56.5 |
| Activated carbon (AC) | 14.1 |
| Denka Black (carbon additive) | 6 |
| Li₂SO₃ (Li⁺ source) | 13.4 |
| PVDF (binder) | 10 |

Lithium sulphite (Li₂SO₃, synthesised according to the first aspect), TR-PAN, activated carbon and Denka Black powders were dried separately at 120° C. under vacuum for 2 hours. 13.4 g of Li₂SO₃, 20 g of TR-PAN, 5 g of activated carbon and 2 g of Denka Black were then ground and mixed (or bead milled using a planetary mixer) and added to 29.5 g of a 12 w/w % solution of PVDF in NMP with constant stirring using a T50 overhead mixer for 1-2 hours until a smooth and homogenous viscous composite ink (or slurry) was obtained. 65 g of excess NMP was added to achieve the desired viscosity and consistency. The ink was cast onto Al foil to form a coating using a Doctor-Blade technique. In the first instance, the wet coatings were dried at 100° C. for 2 hours to remove excess solvent, followed by 120° C. under dynamic vacuum to expel remaining traces of solvent. After evaporation of the solvent thin composite films were obtained.

The electrodes of geometrical area of 1 cm² were assembled into cells with the above-mentioned CuO based anode.

An electrochemical formation step is necessary before cycling the cathode to realise the maximum capacitance. This was achieved by applying a constant current of 0.2 mA for 10 cycles between voltage limits of 0 V and 2.5 V. During formation Li⁺ are released from the cathode and absorbed in the anode by the sink and the SO₃ complex is formed in the cathode as a one-off step. For example with a CuO sink this occurs according to the following proposed reaction scheme.

Cathode Reaction:

$$3Li_2SO_3 \longrightarrow 6Li^+ + 3SO_3^{2-}$$

$$3SO_3 \longrightarrow 3SO_3 + 6e^-$$

$+ 3Li_2SO_3 \longrightarrow$ $+ 6Li^+$

FIG. 1: complex formation in a TR-PAN cathode

Anode Reaction:
$$3CuO \rightarrow 3Cu^{2+} + 3O^{2-}$$
$$3Cu^{2+} + 6e^- \rightarrow 3Cu\downarrow$$
$$6Li^+ + 3O^{2-} \rightarrow 3Li_2O\downarrow$$

As previously described, the complexes will subsequently be doped and de-doped with solution species during normal cycling to maximise capacitance (and hence energy)—achieving the desired "pseudo-capacitance" effect.

Calculation of the Amount of Electrode Components

The above-mentioned amounts of lithium sulphite and CuO sink were carefully chosen in order to avoid the electrodes containing unnecessary weight or non-functional mass after formation. Thus the amount of lithium sulphite used was based on an equimolar ratio (1:1) with the number of active N sites in the TR-PAN (to +-5%). Furthermore, the CuO was used in the same 1:1 ratio (to +-5%).based on the lithium sulphite (having regard to the above illustrated reaction schemes).

The Applicant found that results significantly improved once regard was had to correctly identifying the amount of active N sites in the TR-PAN, which is not the same as the total number of N sites in the pyrolysed polymer (as suggested by the above-mentioned acknowledged prior art). TR-PAN contains three different types of N only one of which is considered active and suitable for forming complexes with SO₃. The types of N in TR-PAN are in different valence states and their structures are represented schematically below. These are the pyridinic N-6 (6-membered ring), pyrolidinic N-5 (5-membered ring) and quaternary N-Q (as in NH₄⁺). N-6 is considered to be the active N component forming complexes with SO₃ according to the above reaction mechanism.

X-ray photoelectron spectroscopy (XPS) may be used to provide information on the surface elemental composition of a material in addition to establishing the valence state of the elements. The Applicant used XPS to determine the relative proportions of the 3 different types of N from an expanded region XPS for the N1s peak. It was determined that the amount of active N sites of the total N sites was only 40%. This then allowed the amount of lithium sulphite and, similarly, the amount of transition metal oxide sink to be calculated accurately, thereby avoiding redundant components.

Cell Test Data

Cells were tested in two modes:
1. Asymmetric and;
2. Symmetric.

4C—Test of Cell in Asymmetric Mode

Figure 6:
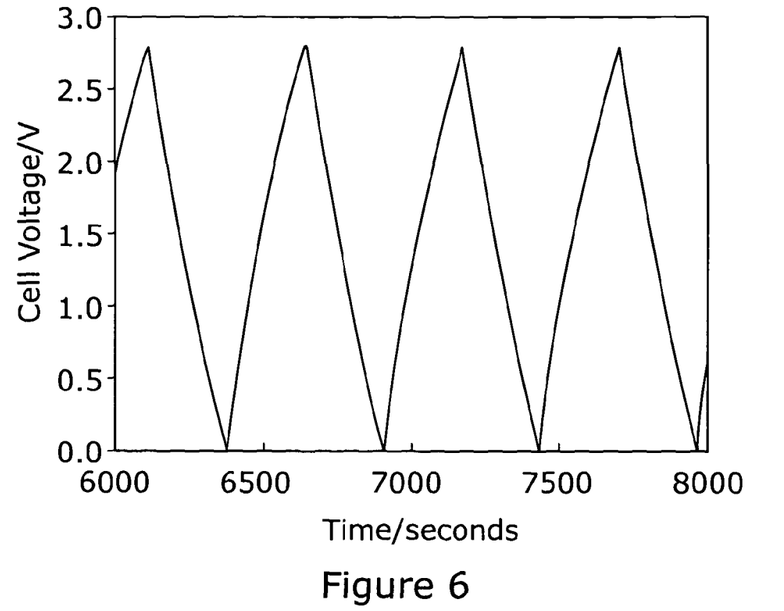
FIG. 6 shows the cycling of the TR-PAN/$Li_2SO_3$/CuO asymmetric supercapacitor of Example 4.

In this test mode, a TR-PAN and $Li_2SO_3$ based cathode was combined with an anode containing TR-PAN and CuO as a lithium sink. Following the formation step, cells were cycled at constant currents varying from 1 mA of 60 mA and the DC capacitance determined from the product of the inverse of the slope of the voltage-time (V-t) plots. FIG. 6 shows the cycling behaviour of the TR-PAN/$Li_2SO_3$/CuO asymmetric supercapacitor; it shows typical saw ooth behaviour for a lab cell charged and discharged at a constant current of 1 mA. The cell delivered a reversible unit capacity of over 0.16 mAh $cm^{-2}$ and capacitance of 0.32 F $cm^{-2}$ to 2.5 V. (For a pure EDLC supercapacitor, typical values of 0.05 mAh $cm^{-2}$ and 0.1 F $cm^{-2}$ would be expected).

Figure 7:
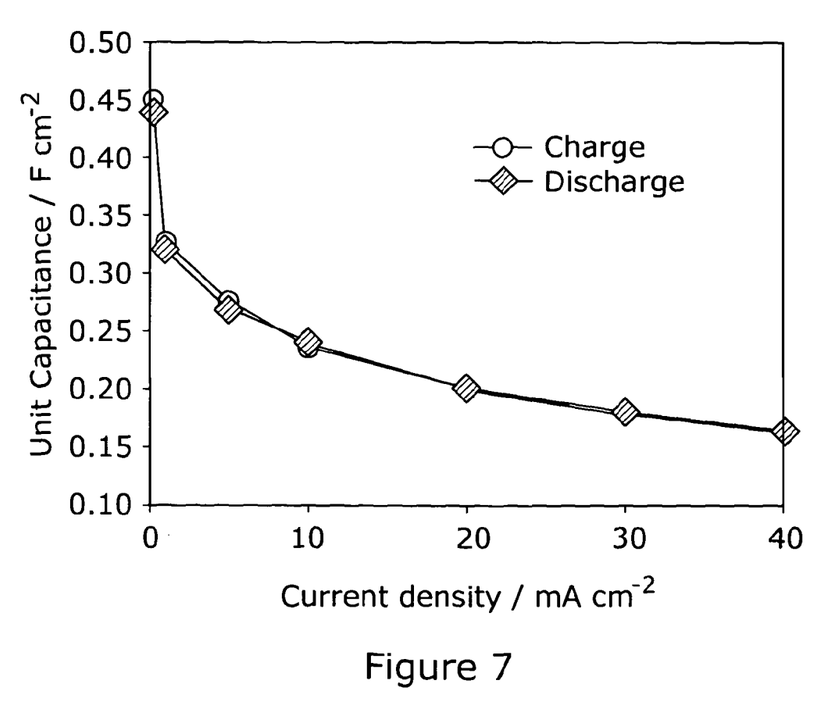
FIG. 7 shows the rate performance of the TR-PAN/$Li_2SO_3$/CuO asymmetric supercapacitor of Example 4.

FIG. 7 shows the rate performance of the asymmetric supercapacitor, namely, the variation of electrode unit capacitance with current density. After an initial sharp drop in unit capacitance, there is a slow decrease from 0.32 F $cm^{-2}$ to 0.164 F $cm^{-2}$ for a 40 times increase in current density. This indicates very good energy retention at high power densities for the electrodes.

Figure 8:
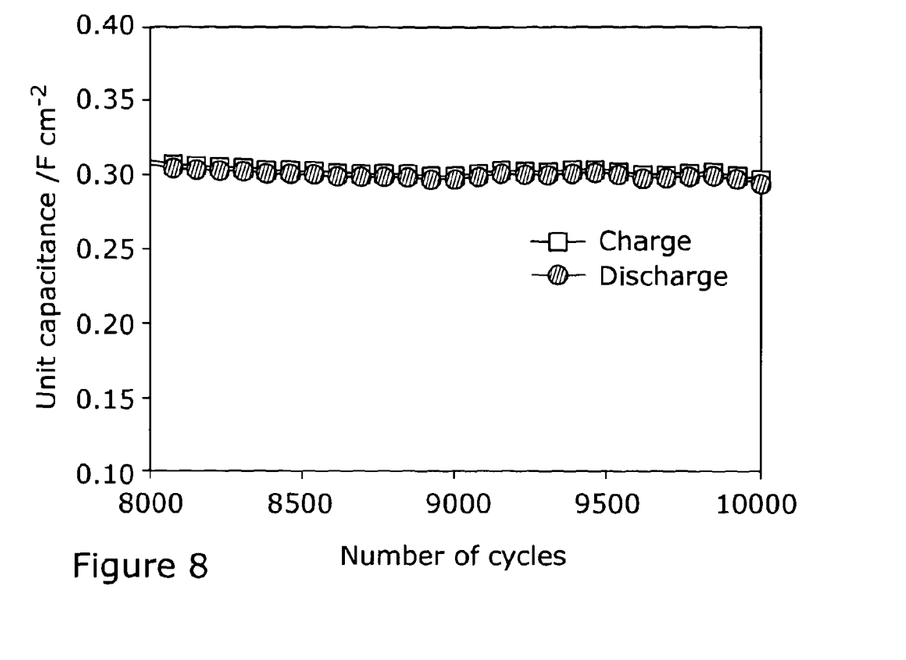
FIG. 8 shows the cycle life performance of the TR-PAN/$Li_2SO_3$/CuO asymmetric supercapacitor of Example 4.

FIG. 8 illustrates the cycle life performance of the asymmetric supercapacitor. Over 10,000 cycles were recorded without any loss of reversibility.

4D—Test of Cell in Symmetric Mode

Figure 9:
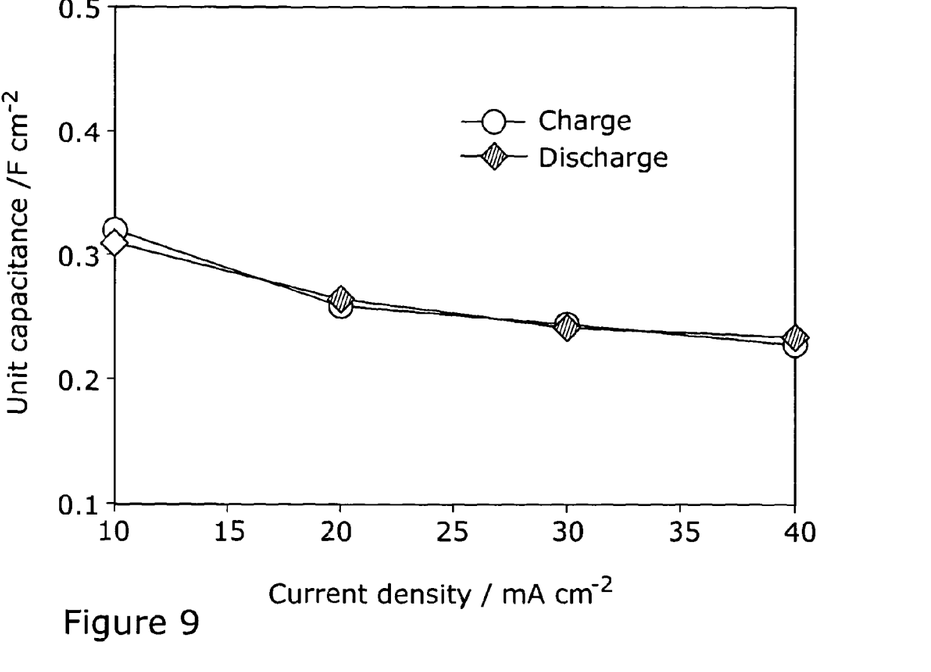
FIG. 9 shows the rate performance of the TR-PAN/$Li_2SO_3$/ symmetric supercapacitor of Example 4; and, FIG. 10 shows the rate performance of the TR-PAN/$Li_2SO_3$/asymmetric supercapacitor (without a lithium sink) of Example 5.

In this test mode following formation, cells are disassembled and the previously formed cathodes were used as both electrodes in test cells. FIG. 9 shows the Rate performance of the symmetric supercapacitor i.e. the variation of electrode capacitance with current density for the symmetric supercapacitor. The capacitance at similar current densities is higher than was observed for the asymmetric cell and the decrease in capacitance with increasing currents is less. This indicates better electrode matching and power performance in the symmetric than asymmetric cells.

Although in Example 4, CuO was used as the sink, other transition metal oxides such as SnO, NiO could also be used as a $Li^+$ sink. SnO is a suitable alternative sink compound and gives rise to an electrode with adequate performance. NiO which has similar physical properties to CuO and SnO, such as reduction potential and weight, would be equally suitable. Electrodes formed using an intercalation compound $Li_4Ti_5O_{12}$ as a sink produced less capacitance as electrodes, probably because more of the electrode is taken up with the parasitic weight of the titanate structure, whereas the metal oxides at least contribute to conductivity when they are left as a metallic residue. Cyclic voltammogram experiments recorded at a scan rate of 10 mV/s showed electrodes with CuO, SnO and $Li_4Ti_5O_{12}$ sinks in the anode delivered a specific capacitance of 400 F/g, 350 F/g and 370 F/g, respectively at 3.5 V (vs Li+/Li).

Example 5

Control Example—Preparation of Anode and Cathode for High Energy Supercapacitors (without a Sink in Anode)

5A—Preparation of Anode Components

TABLE 3

| Anode components | |
|---|---|
| Material | Composition by weight (% w/w) |
| TR-PAN (active material) | 69.5 |
| Activated carbon (AC) | 14.5 |
| Denka Black (carbon additive) | 6 |
| PVDF (binder) | 10 |

TR-PAN, activated carbon and Denka Black powders were dried separately at 120° C. under vacuum for 2 hours. 24 g of TR-PAN, 5 g of activated carbon and 2 g of Denka Black were then ground and mixed (or bead milled using a planetary mixer) and added to 28.6 g of a 12 w/w % solution of PVDF in NMP with constant stirring using a T50 overhead mixer for 1-2 hours until a smooth and homogenous viscous composite ink (or slurry) was obtained. 70 g of excess NMP was added to achieve the desired viscosity and consistency. The ink was cast onto Al foil to form a coating using a Doctor-Blade technique. In the first instance, the wet coatings were dried at 100° C. for 2 hours to remove excess solvent, followed by 120° C. under dynamic vacuum to expel remaining traces of solvent. After evaporation of the solvent thin composite films were obtained.

Electrodes of a geometrical area of 1 $cm^2$ were punched out of the coated sheets and assembled into lab cells with a $Li_2SO_3$ based cathode. A porous glass fibre (Whatman), Celgard 3501 or PTFE based separator was used to electronically separate the cathode from the anode, and either 1M $LiBF_4$ (lithium tetrafluoroborate) and tetraethyl ammonium tetrafluoroborate ($NEt_4BF_4$) in propylene carbonate (PC) or 1.5M $LiBF_4$ in γ-butyralactone/ethylene carbonate (GB/EC) mixture was used as the electrolyte. Ink preparation and cell assembly were carried out in a dry room.

5B—Preparation of Cathode Components

TABLE 4

| Cathode components | |
|---|---|
| Material | Composition by weight (% w/w) |
| TR-PAN (active material) | 56.5 |
| Activated carbon (AC) | 14.1 |
| Denka Black (carbon additive) | 6 |
| $Li_2SO_3$ ($Li^+$ source) | 13.4 |
| PVDF (binder) | 10 |

Lithium sulphite ($Li_2SO_3$, synthesised according to the first aspect), TR-PAN, activated carbon and Denka Black powders were dried separately at 120° C. under vacuum for 2 hours. 13.4 g of $Li_2SO_3$, 20 g of TR-PAN, 5 g of activated carbon and 2 g of Denka Black were then ground and mixed (or bead milled using a planetary mixer) and added to 29.5 g of a 12 w/w % solution of PVDF in NMP with constant stirring using a T50 overhead mixer for 1-2 hours until a smooth and homogenous viscous composite ink (or slurry) was obtained. 65 g of excess NMP was added to achieve the desired viscosity and consistency. The ink was cast onto Al foil to form a coating using a Doctor-Blade technique. In the first instance, the wet coatings were dried at 100° C. for 2 hours to remove excess solvent, followed by 120° C. under dynamic vacuum to expel remaining traces of solvent. After evaporation of the solvent thin composite films were obtained.

The electrodes of geometrical area of 1 cm$^2$ were assembled into cells with a TR-PAN based anode. A porous glass fibre (Whatman), Celgard 3501 or PTFE based separator was used to electronically separate the cathode from the anode, and either 1M LiBF$_4$ (lithium tetrafluoroborate) and tetraethyl ammonium tetrafluoroborate (NEt$_4$BF$_4$) in propylene carbonate (PC) or 1.5M LiBF$_4$ in γ-butyralactone/ethylene carbonate (GB/EC) mixture was used as the electrolyte. Ink preparation and cell assembly were carried out in a dry room.

Cell Test Data

A formation step was carried out before cycling. This was achieved by applying a constant current of 0.2 mA for 10 cycles between voltage limits of 0 V and 2.5 V.

Figure 10:
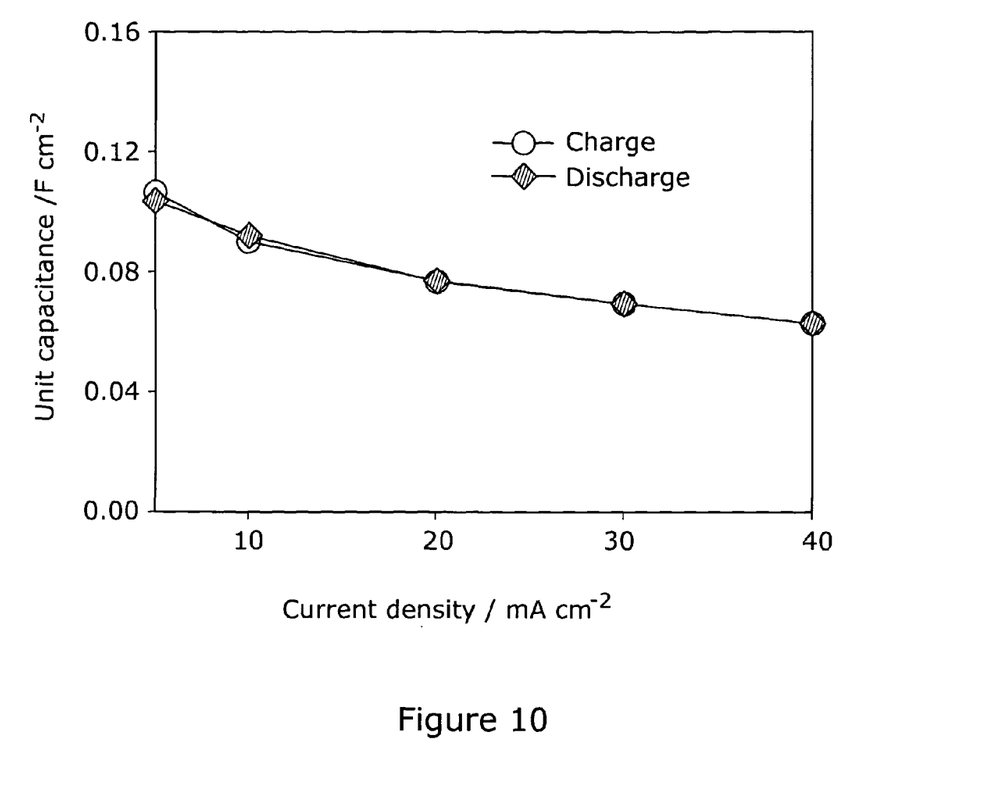

Following formation, the cell was cycled at constant currents varying from 1 mA to 60 mA. FIG. 10 again shows the variation of electrode capacitance with current density. The unit capacitance at all cycling currents was significantly less than observed in the cells with a Li$^+$ sink in the anode. For instance at a current density of 10 mA cm$^{-2}$ a unit capacitance of 0.1 F cm$^{-2}$ was delivered compared with 0.25 Fcm$^{-2}$ for the cell with the anode sink.

CONCLUSION

The cell with the anode sink delivered more than twice the capacitance of the cell without for the same electrode loadings.

The invention claimed is:

1. A process for forming an electrode material comprising a complexing step of causing lithium sulphite to form SO$_3$ complexes at active N sites of a nitrogen-carbon structure, in the presence of a selected amount of a sink that absorbs the liberated lithium, so as to form the N:SO$_3$ complexed electrode material.

2. A process as claimed in claim 1, wherein the nitrogen-carbon structure is thermally restructured polyacrylonitrile (TR-PAN) or a copolymer thereof.

3. A process as claimed in claim 1, wherein lithium sulphite is used roughly in an equimolar ratio with the amount of active N sites in the nitrogen-carbon structure.

4. A process as claimed in claim 1, wherein the amount of the sink is selected based on the amount of lithium sulphite used.

5. A process as claimed in claim 1, wherein the sink is a metal oxide selected from the group consisting of CuO, SnO, and NiO.

6. A process as claimed in claim 1, wherein the complexing step is conducted as an electrochemical formation step in a supercapacitor cell, wherein the nitrogen-carbon structure and lithium sulphite is located in a first electrode and the sink is located in a counterelectrode that absorbs the lithium during the complexing step.

7. A symmetric supercapacitor produced by the process of claim 6, wherein the supercapacitor is subsequently formed from a pair of electrodes, each of which is a first electrode.

8. A process as claimed in claim 1, wherein the complexing step is conducted as a chemical reaction between lithium sulphite and the sink in an aqueous solution in the presence of the nitrogen-carbon structure.

9. A process as claimed in claim 1, wherein the N:SO$_3$ complexed electrode material is subsequently used to form a supercapacitor.

10. An asymmetric supercapacitor produced by the process of claim 6, wherein the supercapacitor is formed from the said first electrode and said counterelectrode.

* * * * *